(12) United States Patent
Smith

(10) Patent No.: US 6,368,384 B1
(45) Date of Patent: Apr. 9, 2002

(54) DESICCANT TABLETS FOR GAS DRYING

(75) Inventor: Kevin W. Smith, McMurray, PA (US)

(73) Assignee: Clearwater, Inc., Pittsburgh, PA (US)

( * ) Notice: Subject to any disclaimer, the term of this patent is extended or adjusted under 35 U.S.C. 154(b) by 0 days.

(21) Appl. No.: 09/803,072

(22) Filed: Mar. 9, 2001

Related U.S. Application Data

(60) Provisional application No. 60/217,805, filed on Jul. 12, 2000.

(51) Int. Cl.[7] ............................................. B01D 53/28
(52) U.S. Cl. ................................. 95/91; 95/92; 95/117; 95/231; 96/118; 252/194
(58) Field of Search .............................. 95/231, 91, 92, 95/117; 96/118, 119, 120; 252/69, 79, 194; 502/401

(56) References Cited

U.S. PATENT DOCUMENTS

| | | | |
|---|---|---|---|
| 2,804,940 A | | 9/1957 | Hutchinson |
| 3,050,920 A | * | 8/1962 | Norton |
| 3,246,454 A | * | 4/1966 | Norton |
| 3,740,966 A | * | 6/1973 | Pravda |
| 3,898,166 A | * | 8/1975 | Cooney |
| 5,104,562 A | | 4/1992 | Kardos et al. ................ 252/79 |
| 5,725,636 A | | 3/1998 | Gavlin et al. ................. 95/231 |
| 5,733,841 A | | 3/1998 | Thomas ...................... 502/400 |
| 5,766,309 A | | 6/1998 | Thomas ......................... 95/91 |
| 5,846,450 A | | 12/1998 | Atkinson ..................... 252/69 |
| 5,922,109 A | | 7/1999 | Rooney et al. ............... 95/231 |
| 6,221,276 B1 | * | 4/2001 | Sarin .......................... 252/76 |

* cited by examiner

*Primary Examiner*—David A. Simmons
*Assistant Examiner*—Frank M. Lawrence
(74) *Attorney, Agent, or Firm*—William L. Krayer

(57) ABSTRACT

Desiccant tablets including solid potassium formate are used to dry gas, especially in natural gas transmission lines. The most preferred tablets comprise 5–15% potassium formate, up to 1% of a surfactant as a lubricant, and the balance desiccant salts, preferably calcium chloride.

20 Claims, No Drawings

DESICCANT TABLETS FOR GAS DRYING

RELATED APPLICATION

This application is based upon and incorporates the entire disclosure and claims of my Provisional Application Serial Number 60/217,805 filed Jul. 12, 2000, and claims the full benefit of its filing date.

TECHNICAL FIELD

Tablets containing potassium formate are useful for drying gases because of their deliquescent properties.

BACKGROUND OF THE INVENTION

In the past, desiccants have been commonly used to dry gases such as natural gas, particularly for its transmission through pipelines. Typically the pipelines carry natural gas over hundreds of miles, and it is necessary and desirable to remove whatever moisture is present in the gas and/or in the pipeline. To this end, the art has employed common desiccant salts such as calcium chloride, made into tablets which tend to absorb the moisture.

An early patent to Hutchinson, U.S. Pat. No. 2,804,940, suggests passing a partially dehydrated natural gas upwards through a bed of solid particulate deliquescent material such as calcium, magnesium, or lithium chloride, or mixtures of them. Certain molar ratios of chlorides and bromides are suggested by Heath in U.S. Pat. No. 2,143,008 and by Thomas in U.S. Pat. No. 5,733,841; see also Thomas U.S. Pat. No. 5,766,309. for a good illustration of the placement of the solid deliquescent materials in a contemporary drying vessel; this patent (U.S. Pat. No. 5,766,309) is incorporated by reference herein in its entirety.

A solution of 40–70% potassium formate is suggested for use as a moisture absorbent in dehumidifiers and similar devices by Atkinson in U.S. Pat. No. 5,846,450.

SUMMARY OF THE INVENTION

Tablets are made of powdered or crystalline potassium formate and used to remove moisture from gases such as natural gas. The tablets may contain from 0.5% to 100% by weight potassium formate, the balance being alkali or alkaline earth metal formates (preferably sodium, calcium, cesium and/or magnesium formate), chlorides and/or bromides (preferably calcium chloride, potassium chloride, cesium chloride, lithium chloride, or mixtures thereof). The tablet is preferably made under compression and, for use in gas dryers in natural gas transmission lines, preferably weighs about 7 to 15 grams so it can conveniently form a bed in a more or less conventional gas dryer. A pillow shape is convenient, but no particular shape is required for this invention. Preferred tablets comprise 97.5% calcium chloride and 2.5% potassium formate. An additional 0.5% of a binder, which is preferably sodium lauryl sulfonate, may also be used.

The preferred tablets need not use these exact proportions, however—they may comprise 0.5% to 100% potassium formate, an additional 0.01% by weight to 1% by weight of a surfactant used as a lubricant, and the balance one or more alkali metal or alkaline earth metal halides.

DETAILED DESCRIPTION OF THE INVENTION

Comparisons have been made of the tablets of the present invention, containing potassium formate, to various tablets containing calcium chloride. For the comparisons, tablets were made of each of the materials indicated. Tablets of each description were placed in a screen basket which in turn was placed in a humidifier and permitted to remove moisture from the same air. The baskets retained the tablets but permitted liquid to drain into a pan. The pans were pre-weighed and weighed again periodically. Results are reported in terms of weight gain (liquid) in the pans, in grams, over time. Table I presents the data obtained.

In Table 1 and elsewhere herein, CaCl2 77% is calcium chloride containing 23% moisture. 10% KCOOH means 77% $CaCl_2$ having an additional (based on the calcium chloride) 10% potassium formate. "94%+10% KF" means, in flake form, 94% calcium chloride, 6% moisture and an additional 10% potassium formate based on the calcium chloride and moisture.

TABLE 1

Weight increase over time (grams)

| Product | 3 hours | 18 hours | 25 hours | 90 hours |
|---|---|---|---|---|
| CaCl2 77% | 0.7295 | 4.609 | 6.5831 | 19.5703 |
| CaCl2 77% | 0.4096 | 3.2685 | 4.5123 | 17.9454 |
| +10% KCOOH | 0.6026 | 6.0434 | 7.6411 | 19.6084 |
| +10% KCOOH | 0.781 | 5.8817 | 7.7085 | 22.1131 |
| 94% + 10% KF | 0.002 | 4.5483 | 5.6003 | 16.0585 |
| 94% + 10% KF | 0.0931 | 3.2718 | 4.294 | 16.8932 |

TABLE 2

Weight increase over time (grams)

| Product | 16 hours | 20 hours | 24 hours | 40 hours |
|---|---|---|---|---|
| CaCl2 77% | 8.9011 | 9.6635 | 10.0889 | 12.4836 |
| 94% + 2.5% KF | 6.9944 | 8.4999 | 9.5212 | 14.1517 |
| 94% + 5.0% KF | 8.245 | 9.0611 | 9.6312 | 12.8922 |
| 94% + 7.5% KF | 7.8536 | 8.7734 | 9.9184 | 13.9462 |
| 94% + 10% KF | 7.259 | 8.1575 | 9.1607 | 13.2313 |

In Table 2, "94%+10% KF" means 94% calcium chloride, 6% moisture and an additional 10% potassium formate based on the calcium chloride and moisture. "2.5% KF," "5% KF," and "7.5% KF" mean the indicated percentages of potassium formate in addition to the 94% calcium chloride. In Table 3, the term NH4F means ammonium formate.

TABLE 3

Weight Increase Over Time (grams)
Hours

| Product | 16 hrs | 20 hrs | 24 hrs | 40 hrs |
|---|---|---|---|---|
| 77% CaC12 | 6.547 | 8.5854 | 9.5619 | 15.3974 |
| 94% CaCl2 + 5% NH4F | 4.964 | 6.3635 | 7.2397 | 12.9733 |
| 94% CaCl2 + 7.5% NH4F | 8.2826 | 10.3386 | 11.3232 | 15.2833 |
| 94% CaCl2 + 10% NH4F | 6.4756 | 8.0257 | 9.0649 | 13.1451 |

TABLE 4

Weight Increase Over Time

| | 2 hours | 5 hours | 24 hours |
|---|---|---|---|
| LiCl | 0.2913 | 1.8077 | 9.8172 |
| KCOOH | 0.5877 | 2.2647 | 9.993 |
| 77% CaC12 | 0.0111 | 0.4246 | 4.9159 |

TABLE 4-continued

| | Weight Increase Over Time | | |
|---|---|---|---|
| | 2 hours | 5 hours | 24 hours |
| Sm. Mesh CaCl2 | 0.2023 | 0.5881 | 4.9159 |
| Prilled CaCl2 | 0.0991 | 0.7136 | 4.6106 |

TABLE 5

| | Weight Increase Over Time | | | | | |
|---|---|---|---|---|---|---|
| | 7 hrs | 22 hrs | 29 hrs | 46 hrs | 53 hrs | 70 hrs |
| 77% CaCl2 | 2.7918 | 10.2764 | 12.082 | 15.7432 | 16.809 | 19.0542 |
| + 2.5% KCOOH | 3.9704 | 11.7115 | 13.8077 | 17.9961 | 19.2392 | 21.8174 |
| + 5.0% KCOOH | 3.8633 | 11.5287 | 14.0292 | 17.9577 | 19.0072 | 21.1038 |
| + 7.5% KCOOH | 4.8065 | 10.7662 | 13.1887 | 16.4462 | 17.7821 | 19.7666 |
| + 10.0% KCOOH | 4.7849 | 10.0518 | 12.7825 | 15.8435 | 17.2899 | 18.937 |

For Table 5, the indicated percentages of potassium formate were added to the standard 77% calcium chloride, which contained 23% by weight moisture at the beginning of the test.

TABLE 6

| | Weight Increase Over Time | | | | |
|---|---|---|---|---|---|
| | 4 hrs | 8 hrs | 24 hrs | 28 hrs | 48 hrs |
| 94% CaCl2 + 10% NaCl | 0.8145 | 2.1562 | 8.3738 | 9.5873 | 15.6393 |
| 94% CaCl2 + 20% NaCl | 1.4649 | 2.6146 | 8.4068 | 9.303 | 14.9175 |
| 100% KCOOH + 20% NaCl | 2.0998 | 3.8347 | 10.8299 | 12.3011 | 15.5572 |
| 100% KCOOH + 20% NaCl | 1.3877 | 2.6183 | 9.3758 | 11.2575 | 14.1278 |
| 94% CaCl2 + 20% CaBr2 | 0.8164 | 1.5235 | 6.7693 | 7.7308 | 13.4968 |

For Table 6, the indicated additions of sodium chloride and calcium bromide were made to 94% calcium chloride in the case of the first, second and fifth tests, and to a 100% aqueous solution of potassium formate in the third and fourth tests.

In each case where potassium formate was present, the formation of the drained solution was faster than with compositions not including potassium formate. Potassium formate clearly absorbs more moisture, more readily, than the other salts tested, and clearly enhances these abilities for any of the solution combinations Thus it will be seen that my invention comprises a deliquescent gas drying tablet comprising 0.5% to 100% solid potassium formate and 0% to 99.5% alkali, alkaline earth metal or ammonium formates, chlorides, bromides or mixtures thereof. The composition is preferably comprises about 5% to about 99.5% by weight potassium formate and most preferably about 5% to about 15% potassium formate with the balance being desiccant salts such as alkali (including cesium), alkaline earth metal or ammonium formates, chlorides, bromides or mixtures thereof, with calcium chloride being preferred.

What is claimed is:

1. A deliquescent gas drying tablet comprising 0.5% to 100% solid potassium formate and 0% to 99.5% alkali, alkaline earth metal or ammonium formates, chlorides, bromides or mixtures thereof.

2. A deliquescent tablet of claim 1 wherein the potassium formate comprises about 5% to about 99.5% by weight.

3. A deliquescent tablet of claim 2 comprising about 0.5% to about 95% calcium chloride.

4. A deliquescent tablet of claim 1 wherein the potassium formate comprises 5% to 95% by weight of said tablet.

5. A deliquescent tablet of claim 1 wherein the potassium formate comprises 5% to 15% of said tablet.

6. Method of drying gas comprising contacting gas with a bed of tablets comprising potassium formate thereby forming an aqueous solution of potassium formate comprising water from said gas and potassium formate from said tablet, and separating said solution from said bed of tablets.

7. Method of claim 6 wherein at least some of said solution is permitted to remain in contact with said bed of tablets and to contact said gas, whereby said solution continues to remove moisture from said gas until said tablets are substantially dissolved.

8. Method of claim 6 wherein said tablets comprise 5% to 99.5% potassium formate.

9. Method of claim 8 wherein said tablets comprise about 5% to about 15% potassium formate and the balance is desiccant salts.

10. Method of claim 6 wherein said gas is natural gas.

11. Method of claim 9 wherein said balance of desiccant salts comprise predominantly calcium chloride.

12. Method of claim 6 wherein said separating is accomplished by draining.

13. Method of claim 7 followed by replacing said bed of tablets with new tablets comprising solid potassium formate.

14. Method of claim 13 followed by another iteration of the method of claim 13.

15. Method of claim 9 wherein said desiccant salts include lithium chloride.

16. Method of claim 9 wherein said desiccant salts include cesium chloride.

17. Method of claim 6 wherein contacting of said gas with said bed of tablets is accomplished by flowing said gas upwardly through said bed of tablets.

18. A desiccant tablet comprising about 5% to about 15% by weight potassium formate, about 0.1 to 1% surfactant, and the balance at least one desiccant salt.

19. A desiccant tablet of claim 18 made by compression, wherein said surfactant is sodium lauryl sulfonate.

20. A desiccant tablet of claim 18 wherein said at least one desiccant salt comprises calcium chloride.

* * * * *